Jan. 2, 1968
MASAO SATO ET AL
3,361,319
APPARATUS FOR MAKING HOLLOW TUBES OF
METAL PLATES CUT IN ADVANCE
Filed Dec. 22, 1964
3 Sheets-Sheet 1
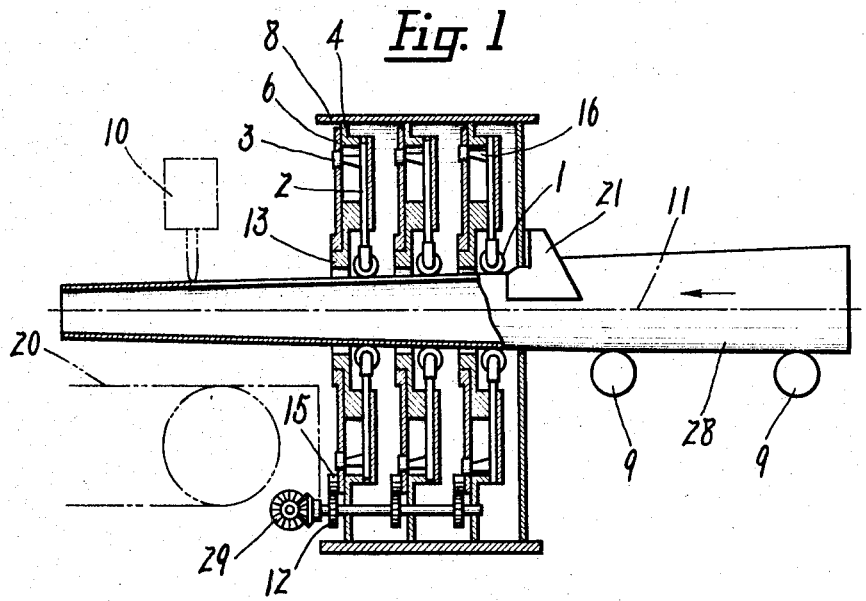
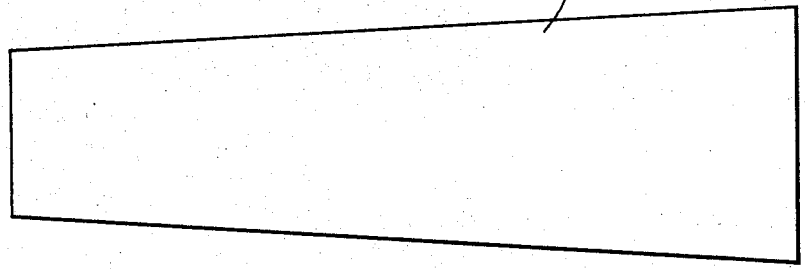
INVENTORS
Masao Sato
and
Kenzo Izumi
BY Wenderoth, Lind and
Ponack, ATTORNEYS Jan. 2, 1968  MASAO SATO ET AL  3,361,319
APPARATUS FOR MAKING HOLLOW TUBES OF
METAL PLATES CUT IN ADVANCE
Filed Dec. 22, 1964  3 Sheets-Sheet 3
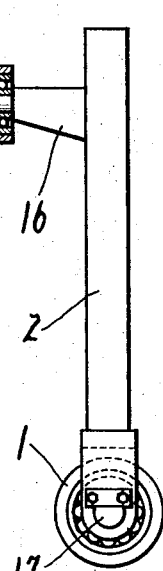
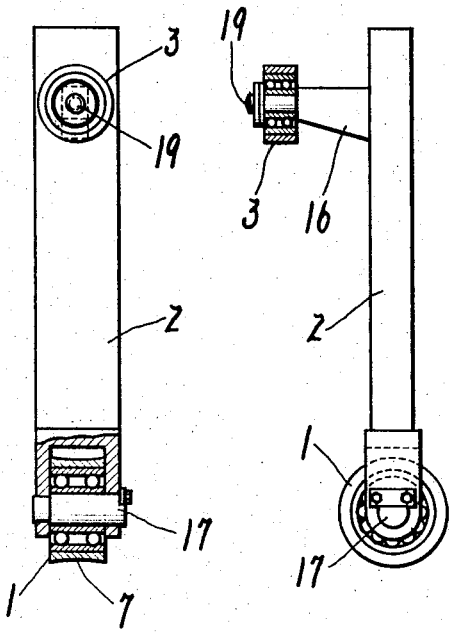
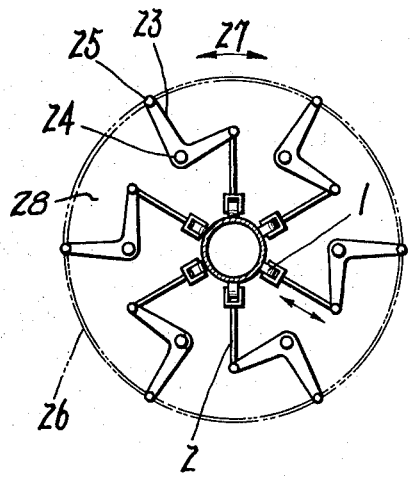
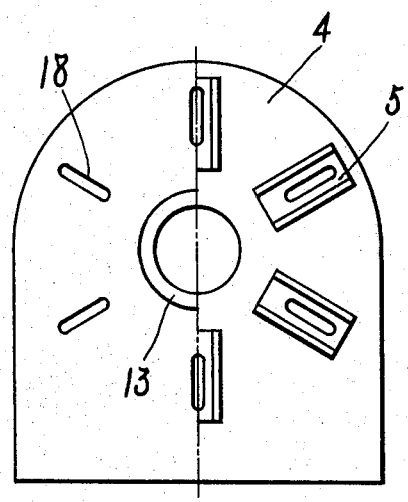
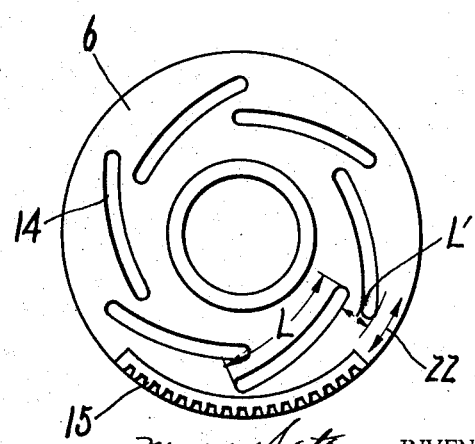
INVENTORS
Masao Sato
and
Kenzo Izumi
BY Wenderoth, Lind and Ponack
ATTORNEYS

United States Patent Office 3,361,319
Patented Jan. 2, 1968

3,361,319
APPARATUS FOR MAKING HOLLOW TUBES OF METAL PLATES CUT IN ADVANCE
Masao Sato, Kitakyushu, and Kenzo Izumi, Tokyo, Japan, assignors to Yawata Iron & Steel Co., Ltd., Tokyo, Japan, a corporation of Japan
Filed Dec. 22, 1964, Ser. No. 420,401
Claims priority, application Japan, Dec. 27, 1963, 38/70,445
6 Claims. (Cl. 228—7)

ABSTRACT OF THE DISCLOSURE

An apparatus for making tapered tubes from metal plates cut in advance, comprising a means for moving a tapered metal plate through the apparatus, a plurality of shaping roller groups each having a plurality of shaping rollers positioned around the periphery of a closed figure, said shaping roller groups being positioned along and concentric with an axis extending in the moving direction of said metal plate, said shaping rollers being mounted on said apparatus for movement in the radial direction relative to said axis, roller moving means coupled to said rollers and moving said rollers radially with the movement of said metal plate, and a means for welding the joint of metal plate coming out of said plurality of roller groups in the form of a tapered tube.

---

This invention relates generally to apparatus for making hollow tubes and more particularly to apparatus for making tapered tubes of metal plates cut in advance.

Tapered poles made of a metal for illuminating lamps on streets or roads have been adopted recently in city plannings and road equipment plans. Such tapered poles are also used for cable poles, stays and flag poles. Due to advantages in their fine appearance, high strength and light weight, they are expected to be used more widely in the future. In view of these trends, the present invention is to provide an apparatus for making tapered tubes which is simple and convenient and in which the production cost is low and the shaping operation is easy.

An object of the present invention is to provide an apparatus for mass-producing tapered tubes wherein the shaping resistance is made as small as possible by eliminating such consumption as in the conventional die shaping method, the shaping operation is mechanically easy and the precision is high.

In the producing apparatus of the present invention, a tapered tube is formed of a metal plate cut in advance by passing the metal plate through a peripheral curved surface formed of a group of rollers arranged on the same periphery to press it with many contact surfaces by utilizing the resiliency of the plate while continuously radially withdrawing said group of rollers or enlarging the diameter of the group at the same time in proportion to the advance of the material and the product is finished by being welded and ground at the joints at the outlet.

The present invention is an apparatus for producing hollow tubes of metal plates cut in advance comprising a means for moving a cut metal plate between shaping rollers, a means for shaping said metal plate into a tapered tube and radially moving said shaping rollers with the movement of the formed tube, a means for keeping the jointing intervals of the formed tube in fixed positions while shaping said cut metal plate and a means for welding the formed tube at the joints.

The invention will be described in connection with the accompanying drawings, in which:

FIGURE 1 is a sectional elevation view of an apparatus according to the present invention;

FIGURE 2 is a developed view of a tapered tube;

FIGURE 3 is an elevation view, partly in section, of a tapered tube made with the apparatus of the present invention;

FIGURES 6(a) and 6(b) are enlarged front and side elevation views, respectively, and partly in section of a pressing member in the roller group of FIGURE 3;

FIGURE 7(a) is an enlarged elevation view of a fixed guide plate of the apparatus shown in FIGURE 1;

FIGURE 7(b) is an enlarged elevation view of a cam plate of the apparatus shown in FIGURE 1; and FIGURE 8 is an end elevation view of another example of the essential part in FIGURE 1.

Figures 4A, 4B, 4C, 4D:
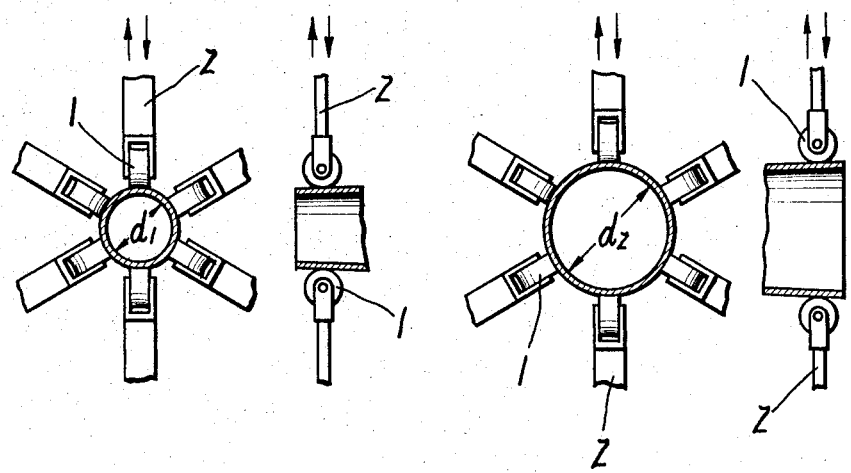
FIGURE 4(a) is an end elevation view showing a group of shaping rollers acting on the small diameter part of a tapered tube.
FIGURE 4(b) is a side elevation view of the parts of FIGURE 4(a)
FIGURE 4(c) is an end elevation view of a group of shaping rollers acting on the large diameter part of a tapered tube.
FIGURE 4(d) is a side elevation view of the parts of FIGURE 4(c)
Figure 5A:
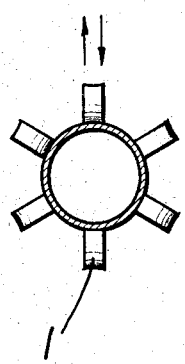
FIGURE 5(a) is an end view of an arrangement of the first group of rollers.
Figure 5B:
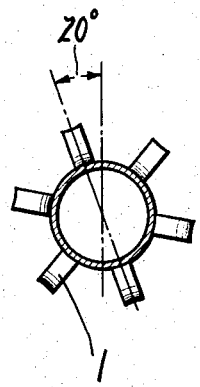
FIGURE 5(b) is an end view of an arrangement of the second group of rollers.
Figure 5C:
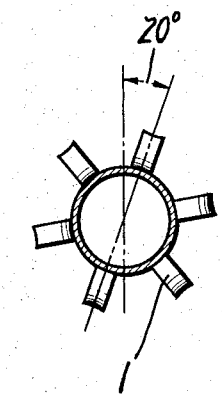
FIGURE 5(c) is an end view of an arrangement of the third group of rollers.

The apparatus of the present invention shall now be explained with reference to an embodiment. However, this is only an exemplification and other modified apparatus can be easily formed by using the same principle. The subject matter of the present invention shall be explained by means of FIGURE 1 illustrating an apparatus of the present invention. A tapered edge metal plate 28 cut in advance as is illustrated in FIGURE 2 (which metal plate shall be referred to as a steel plate hereinafter) is pulled into a pressing machine 8 for forming tubes through a guide roller 9 by means of a steel plate and gripping device (not illustrated) from the right side in the drawing, is shaped into a tapered tube in said machine and is then welded at the joints at both ends by means of a welding machine 10. In order to press and shape said steel plate 28 into the form of a tube, several groups of shaping rollers movable radially of the tube are set on the same periphery around a center axis 11. Each of said groups of rollers 1 is formed of six shaping rollers 1 arranged to form holes of the small diameter $d_1$ and large diameter $d_2$ of the tapered tube as illustrated in FIGURE 4. Three of such groups of rollers are used as illustrated at (a), (b) and (c) in FIGURE 5. The rollers in the groups in (a), (b) and (c) are set at angular intervals of 20 degrees. Therefore, they are arranged at 18 equally spaced points on the periphery as a whole to form one circular hole die. Said three groups of the shaping rollers are divided into a first set, second set and finishing set spaced at short distances on a straight line. However, according to the requirement of the finishing precision of the tapered tube, the number of groups of the shaping rollers may be increased. Therefore, depending on the precision of the tapered tube, only the first group of the rollers may be used.

A base plate 4 having a hole of such inside diameter as will not interfere with the size of the tapered tube to be formed and having a boss 13 on the peripheral edge of the hole of said inside diameter is securely fixed within the above mentioned pressing machine 8. Said base plate 4 has a plurality of openings 18 extending radially as illustrated in FIGURE 7(a) and is provided on the other side with guides 5 for holding later described supporting shafts 2 for the shaping rollers 1.

Further, within the pressing machine 8 is rotatably fitted a cam plate 6 having a hole of a diameter to be fitted to said boss 13 on the above mentioned base plate 4. As illustrated in FIGURE 7(b), said cam plate 6 is provided with sliding grooves 14 arranged side by side on the same periphery and is fitted with an attached gear 15 of a proper width on the lower outer periphery.

The length of said attached gear 15 is to be determined by the length L of said sliding groove 14 and the degree L' of the radial deflection of the groove 14. Thus, when said cam plate 6 is rotated, the sliding grooves 14 will slide so as to be radially displaced. Pressing members for forming tapered tubes are provided so as to perform such displacement. The pressing member is illustrated in FIGURE 6 and has rotatably mounted thereon a cam plate roller 3 fitted at the forward end of a supporting rod 16 extending at right angles to the upper end of the supporting shaft 2 and held with a bolt latch 19. On the other hand, the shaping roller 1 having a concavely curved surface 7 is rotatably mounted on the lower end of the supporting shaft 2 on a pin 17. A ball bearing or the like may be used in said forming roller 1 to make the rotation smooth.

As described above, the pressing machine 8 in the present apparatus has three sets of elements each having a base plate 4, cam plate 6 and pressing members for forming tapered pipes. First of all, in fitting the cam plate 6 to the boss 13 on the base plate 4 fixed to the frame of the pressing machine 8, the bolt latch 19 of each tapered tube pressing body is removed and the opening 18 in the base plate 4 receives the supporting rod 16. Then, said bolt latch 19 is fastened to again hold the cam plate roller 3. Said roller 3 will be loosely fitted in the groove 14 in the cam plate 6. The supporting shaft 2 of the pressing member will be held in the guide 5 on the base 4 so as to slide radially.

Further, the gear 15 on said cam plate 6 is made to engage with a gear 12 so that the shaping rollers 1 can be moved radially to form a tapered tube with the advance of the steel plate 28 in the direction indicated by the arrow 19 in FIGURE 1.

A driving force will pull the gripping device (not illustrated) of the tapered tube by means of a wire 20 or the like and the displacement is coupled to said gear 12 through a power transmitting shaft driving wheel 29.

In such arrangement as is described above, the shaping rollers 1 will expand in proportion to the advance of the steel plate. Such related device as the above mentioned gripping device is only for exemplification. Needless to say, it is also possible to use any already known automatic oil pressure device or the like.

Further, in the present apparatus formed as described above, on the inlet side of the pressing machine 8, a welding line guide plate 21 is provided so that the joint of the formed tapered tube may be positioned on the line of a welding machine 10 on the outlet side.

The method of operating the above described present apparatus shall be described. The material steel plate 28 cut in advance as shown in FIGURE 2 is first roughly formed in a preceding step before it comes to the pressing machine 8 in the present apparatus so as to be easily gripped at the forward end part with such gripping device as a proper puller. Then the material will enter the machine while being shaped to be substantially in the form of a U by the guide roller 9 at the inlet of the present pressing machine. It is effective to shape only the forward end part of said material in advance so that it is substantially circular so that the operation at the beginning of pulling said material into the present pressing machine 18 may be smooth. In such case, each shaping roller 1 of the present pressing machine 8 will be adjusted to the position of the start of shaping, the material 28 will be positively gripped at the forward end part with the gripping device and then the pressing machine will be started. With the displacement of the length of the wire 20 of the puller of the gripping device (not illustrated), the power transmitting wheel 29 and the operatively connected gear 12 will be rotated. This rotation will also rotate the above mentioned cam plates 6 and will further move the related mechanisms of the supporting shafts 2, cam rollers 3 and cam plate 6 so that the shaping rollers 1 will automatically change their positions to expand the entire hole shape in proportion to the advance of the material and will form a tapered tube while pressing the material 28. The product coming out of the pressing machine will be welded at the joints with the welding machine 10 while being guided by the guide roller. When the entire product has passed, the rollers 1 of the present pressing machine 8 and the gripping device of the puller will quickly return to the original positions. The welded product will be fed on a table to the next step.

The curved surface 7 of the shaping rollers 1 in the above mentioned pressing machine 8 is so formed as to coincide with the curvature of the diameter (maximum diameter) at the final end of the conical or tapered tube.

Therefore, in the shaping of the forward end part of the tube, a circle will be formed of the minimum diameter of the material as a whole while each roller 1 makes a short arc contact with the material. When the pressing bending force is too strong or too weak, it will be adjusted by the positions of the cam rollers 3 of the rollers 1. That is to say, the relation of the cam plate 6 and attached gear 15 is adjusted by moving the gear 15 in the direction indicated by the arrow 22 in FIGURE 7(b). It is more effective to set double adjusting devices so that such phase advancing adjustment as will advance the engaging position of the gears in advance may be made in such power transmitting gear mechanism as the gears 12 and 15 in the pressing machine 8.

As in the above, the radial movement of the shaping rollers 1 with the advance of the material in the apparatus of the present invention is not limited to the above described gear mechanism. For example, the lengthwise advance of the material and the radial movement of the shaping rollers 1 may be electrically controlled. Or, as in FIGURE 8, each L-shaped lever 23 is fixed at the corner part 24 to disk 28 and is connected at one end to the roller supporting shaft and at the other end 25 are fixedly connected on a circular line 26, and means for rotating the disk (not shown) is connected to the plate moving means so that, when said disk is rotated in the direction indicated by the arrow 27 during the advance of the tapered tube, the supporting shaft 2 of each shaping roller 1 will be moved radially in a connecting rod mechanism.

What is claimed is:

1. An apparatus for making tapered tubes from metal plates cut in advance comprising a means for moving a tapered metal plate through the apparatus, a plurality of shaping roller groups each having a plurality of shaping rollers positioned around the periphery of a closed figure, said shaping roller groups being positioned along and concentric with an axis extending in the moving direction of said metal plate, said shaping rollers being mounted on said apparatus for movement in the radial direction relative to said axis, roller moving means coupled to said rollers, means for coupling said roller moving means to said plate moving means for moving said rollers radially with the movement of said metal plate moving means, and a means for welding the joint of metal plate coming out of said plurality of roller groups in the form of a tapered tube.

2. The apparatus as claimed in claim 1 wherein said shaping rollers of each group define a circular hole and said rollers are movable radially of the circular hole.

3. The apparatus as claimed in claim 1 wherein the roller moving means comprises a rotatable cam plate coupled to the means for moving the tapered material metal plate for rotation during movement of said plate moving means, said cam plate having a plurality of cam grooves side by side therein, and said shaping rollers each having a cam roller at one end fitted in one of said cam grooves, said shaping rollers moving in the radial direction with the rotation of said cam plate.

4. The apparatus as claimed in claim 1 wherein said shaping roller groups are positioned successively along said axis and each defines a smaller circular hole than the preceding shaping roller group in the moving direction of the metal plate.

5. The apparatus as claimed in claim 4 wherein the positions of the shaping rollers forming the shaping roller groups are circumferentially offset with respect to the rollers in the other shaping roller groups, so that the rollers of all the shaping roller groups together form a single circular hole with a continuous periphery.

6. The apparatus as caimed in claim 1 wherein the roller moving means comprises a disk coupled to the plate moving means for rotation with the movement of said metal plate moving means, a plurality of L-shaped levers each connected at one end to a fixed point and at the other end with a shaping roller supporting shaft and being pivoted at the elbow on said disk, the shaping rollers moving in the radial direction through said levers during rotation of the disk.

References Cited
UNITED STATES PATENTS

| | | | |
|---|---|---|---|
| 2,430,210 | 11/1947 | Bruegger | 29—157.3 |
| 2,927,372 | 3/1960 | Powell. | |
| 3,236,083 | 2/1966 | Linderoth et al. | 228—17 |

JOHN F. CAMPBELL, *Primary Examiner.*

M. L. FAIGUS, *Assistant Examiner.*